(12) United States Patent
Almeida (10) Patent No.: US 11,432,532 B2
(45) Date of Patent: Sep. 6, 2022

(54) GROUND ANCHOR WITH DETACHABLE RETRACTABLE LEASH

(71) Applicant: Hernan Almeida, Oakwood Hills, IL (US)

(72) Inventor: Hernan Almeida, Oakwood Hills, IL (US)

(*) Notice: Subject to any disclaimer, the term of this patent is extended or adjusted under 35 U.S.C. 154(b) by 119 days.

(21) Appl. No.: 16/862,529

(22) Filed: Apr. 29, 2020

(65) Prior Publication Data

US 2020/0337271 A1 Oct. 29, 2020

Related U.S. Application Data

(60) Provisional application No. 62/840,162, filed on Apr. 29, 2019.

(51) Int. Cl.
*A01K 27/00* (2006.01)
*A01K 1/04* (2006.01)

(52) U.S. Cl.
CPC .............. *A01K 27/004* (2013.01); *A01K 1/04* (2013.01)

(58) Field of Classification Search
CPC ................................ A01K 27/004; A01K 1/04
See application file for complete search history.

(56) References Cited

U.S. PATENT DOCUMENTS

| | | |
|---|---|---|
| 4,536,107 A | 8/1985 | Sandy et al. |
| 4,796,566 A * | 1/1989 | Daniels ............... A01K 1/04 119/789 |
| 5,732,659 A | 3/1998 | Wiggins |
| 6,318,302 B1 | 11/2001 | Bedient |
| D456,242 S | 4/2002 | Stekelenburg |
| 6,810,630 B2 | 11/2004 | Chizmas |
| 7,484,477 B2 | 2/2009 | Wojcik et al. |
| 2007/0181079 A1 | 8/2007 | Fong |
| 2007/0215064 A1 | 9/2007 | Petersen |
| 2008/0000430 A1 | 1/2008 | Petersen |
| 2012/0137978 A1* | 6/2012 | McBounds .......... A01K 27/004 119/72 |
| 2015/0101153 A1* | 4/2015 | Cuppan ................ B60R 22/105 24/163 K |
| 2015/0164042 A1 | 6/2015 | Moore |
| 2018/0206454 A1 | 7/2018 | Brown |

FOREIGN PATENT DOCUMENTS

CN 203555023 U 4/2014

OTHER PUBLICATIONS https://www.ebay.com/itm/Streetwize-Camping-Screw-in-Ground-Dog-Anchor-with-4m-Tether-Lead/322605272199 (Year: 2017).*
https://web.archive.org/web/20170831002352/https://www.avcokey.com/Small-Seat-Belt-Buckle-Key-Holder-with-Nylon-Strap.aspx (Year: 2017).*

* cited by examiner

*Primary Examiner* — Timothy D Collins
*Assistant Examiner* — Maria E Graber (57) ABSTRACT

A portable pet tether apparatus readily attaches onto a retractable pet leash. The portable pet tether allows a user to tether a pet anywhere. The portable pet tether consists of a corkscrew ground anchor that is rotatably connected to a leash receiver. The ground anchor is secured to the ground. The retractable pet leash can then be removably connected to the leash receiver through an attachment mechanism. The removably connected retractable pet leash may be detached from the leash receiver through the actuation of a release button.

8 Claims, 9 Drawing Sheets

GROUND ANCHOR WITH DETACHABLE RETRACTABLE LEASH

The current application claims a priority to the U.S. Provisional Patent application Ser. No. 62/840,162 filed on Apr. 29, 2019.

FIELD OF THE INVENTION

The present invention relates generally to a pet tethering device, specifically a ground anchor with a detachable pet leash.

BACKGROUND OF THE INVENTION

Retractable leashes have long been the common apparatus used to walk dogs. Retractable leashes allow the owner to control the length of the leash to either prevent the dog from getting close to something or give the dog more freedom to move around. However, there are times where a user may not have the retractable leash on the user but still want the dog attached to the retractable leash. To get around this, the user will secure the retractable leash so that the retractable leash will not move. Unfortunately, there are no apparatuses that allow the user to conveniently secure the retractable leash so that the retractable leash does not move. Therefore, there is a need for an apparatus that secures retractable leashes in a convenient manner.

The present invention is an apparatus that receives and secures a retractable leash to the ground. The present invention allows the user to conveniently secure a retractable leash so that the retractable leash does not move.

SUMMARY OF THE INVENTION

The present invention is a portable pet tether that receives and secures a pet leash to the ground. In the preferred embodiment of the present invention, the portable pet tether allows the pet leash to be used as a tie-out cable for a pet. The portable pet tether comprises an anchor, a mounting platform, and a leash receiver. The mounting platform is connected adjacent to the anchor. The leash receiver is rotatably connected to the mounting platform, opposite to the anchor portion side. The leash receiver comprises an attachment mechanism, where the leash receiver is configured to removably receive a leash unit through the attachment mechanism. In the preferred embodiment of the present invention, the anchor may take the form of a corkscrew ground anchor that secures into soft ground. In various embodiments, the anchor may take the form of any suitable ground anchoring implement, such as, but not limited to pole clamps, deck brackets, fencing brackets, hard ground anchors, or any other suitable anchoring implement. In the preferred embodiment of the present invention, the anchor can be made out of any durable material, such as, but not limited to steel, aluminum, or any other durable alloy.

In the preferred embodiment of the present invention, the mounting platform may take the form of a metal plate that secures the leash receiver to the anchor. In the preferred embodiment of the present invention, the leash receiver may take the form of a rectangular body, but may take the form of any other shape, such as, but not limited to elliptical, circular, triangular, or any other shapes. In the preferred embodiment of the present invention, the pet leash may take the form of a buckle type of attachment mechanism, but can take the form of any other attachment mechanism, such as, but not limited to electromagnets, tab connections, quick detach links, or any other suitable attachment mechanism.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 7:
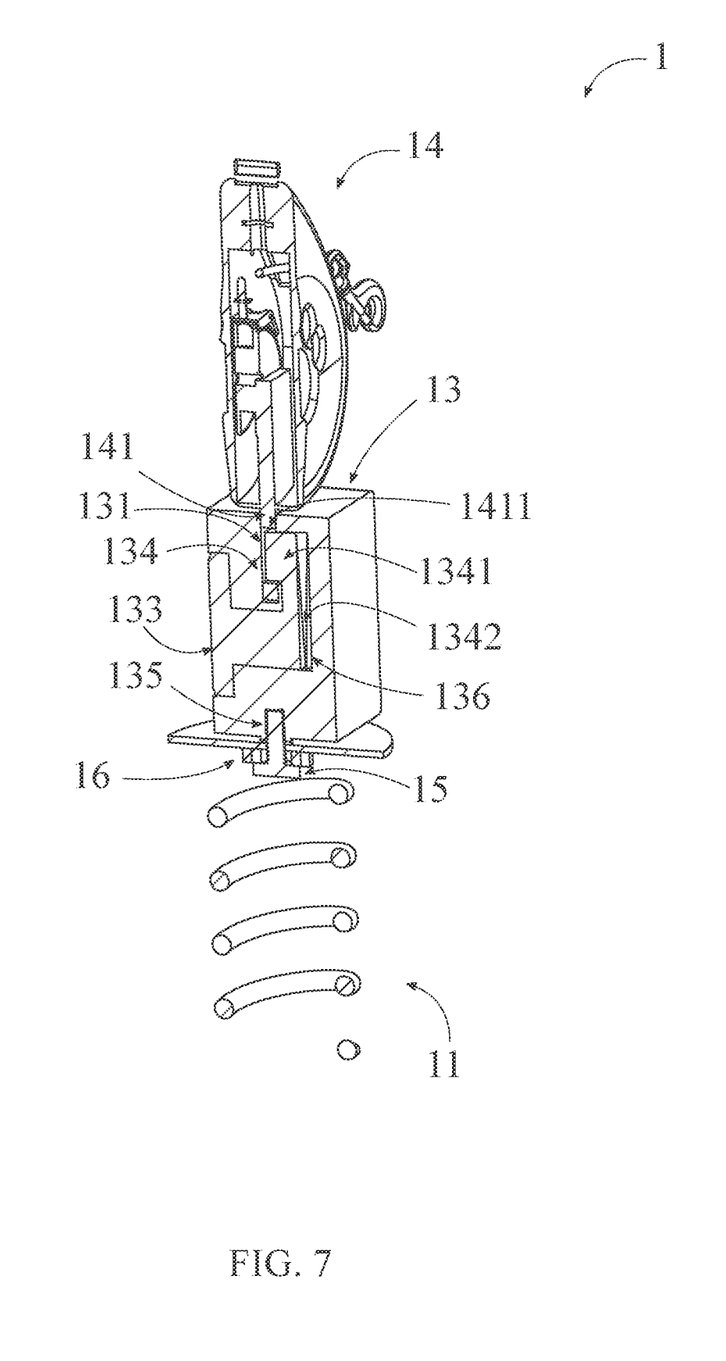
FIG. 7 is a perspective cross section view of the present invention taken along cutting line A-A in FIG. 6.

In reference to FIGS. 1-7, the present invention is a portable pet tether 1 that receives and secures a pet leash to the ground. In the preferred embodiment of the present invention, the portable pet tether 1 allows the pet leash to be used as a tie-out cable for a pet. In reference to FIGS. 1-5, and 7, the portable pet tether 1 comprises an anchor 11, a mounting platform 12, and a leash receiver 13. The mounting platform 12 is connected adjacent to the anchor 11. The leash receiver 13 is rotatably connected to the mounting platform 12, opposite to the anchor portion side. The leash receiver 13 comprises an attachment mechanism 131, where the leash receiver 13 is configured to removably receive a leash unit through the attachment mechanism 131, as shown in FIG. 7. In the preferred embodiment of the present invention, the anchor 11 may take the form of a corkscrew ground anchor 11 that secures into soft ground. In various embodiments, the anchor 11 may take the form of any suitable ground anchoring implement, such as, but not limited to pole clamps, deck brackets, fencing brackets, hard ground anchors, or any other suitable anchoring implement. In the preferred embodiment of the present invention, the anchor 11 can be made out of any durable material, such as, but not limited to steel, aluminum, or any other durable alloy. In the preferred embodiment of the present invention, the mounting platform 12 may take the form of a metal plate that secures the leash receiver 13 to the anchor 11. In the preferred embodiment of the present invention, the leash receiver 13 may take the form of a rectangular body, but may take the form of any other shape, such as, but not limited to elliptical, circular, triangular, or any other shapes. In the preferred embodiment of the present invention, the pet leash may take the form of a buckle type of attachment mechanism 131, but can take the form of any other attachment mechanism 131, such as, but not limited to electromagnets, tab connections, quick detach links, or any other suitable attachment mechanism 131.

In the preferred embodiment of the present invention, the leash receiver 13 comprises a locking channel 132, a locking mechanism 134, and a release button 133, as shown in FIG. 7. The portable pet tether 1 further comprises a retractable leash body 14. The retractable leash body 14 comprises a mounting buckle 141. The locking mechanism 134 is positioned within the leash receiver 13. The locking channel 132 traverses into the leash receiver 13 to the locking mechanism 134. The mounting buckle 141 is removably attached to the locking mechanism 134, where the mounting buckle 141 is positioned within the locking channel 132 when the mounting buckle 141 is attached to the locking mechanism 134. The release button 133 is operatively engaged with the locking mechanism 134, where the mounting buckle 141 is detached from the locking mechanism 134 through actuation of the release button 133. In the preferred embodiment of the present invention, the retractable leash body 14 may take the form of a polymer frame housing of a retractable leash. In the preferred embodiment of the present invention, the mounting buckle 141 may take the form of a buckle connector that removably attaches to the locking mechanism 134. The locking mechanism 134 may take the form of a buckle type locking mechanism 134, such that the locking mechanism 134 removably attaches to the mounting buckle 141 when the mounting buckle 141 is inserted into the locking channel 132. The user can then release the mounting buckle 141 from the locking mechanism 134 through the actuation of the release button 133.

Figure 1:
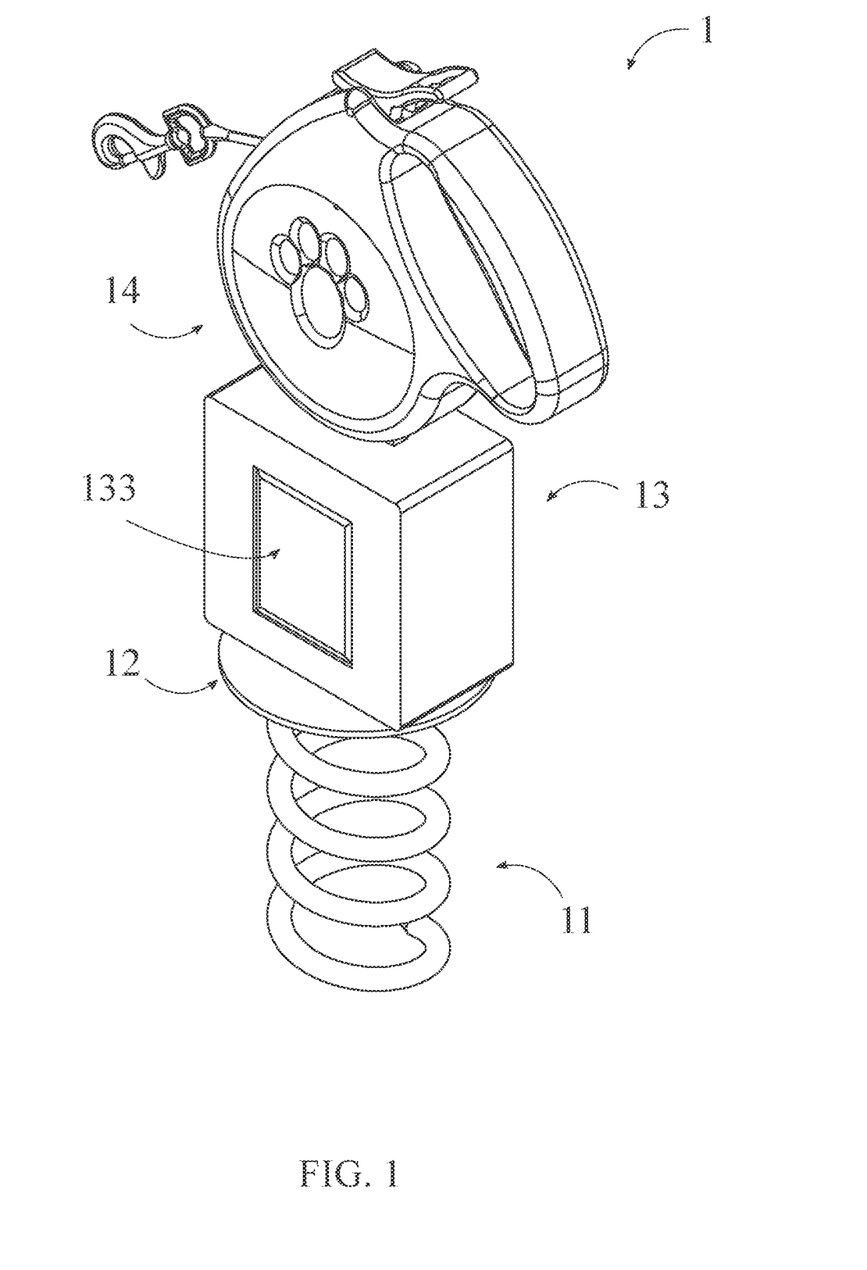
FIG. 1 is a top perspective view of the present invention.
Figure 2:
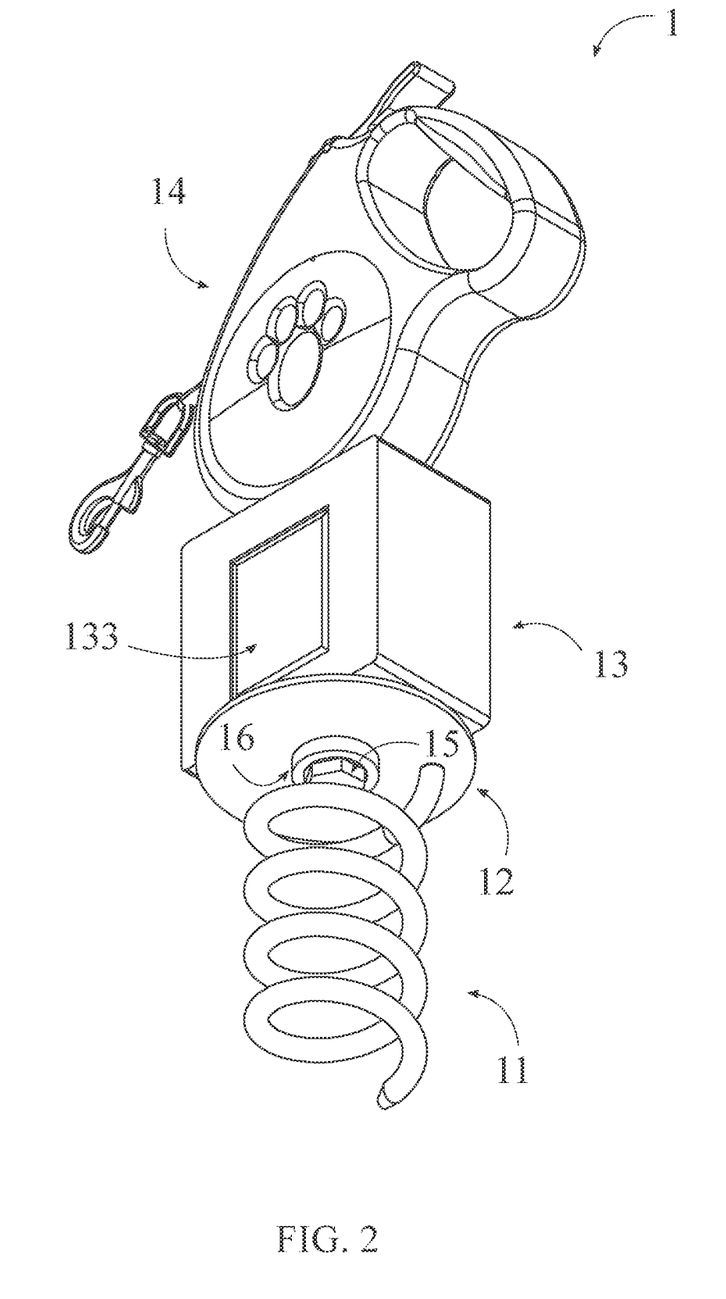
FIG. 2 is bottom perspective view of the present invention.
Figure 3:
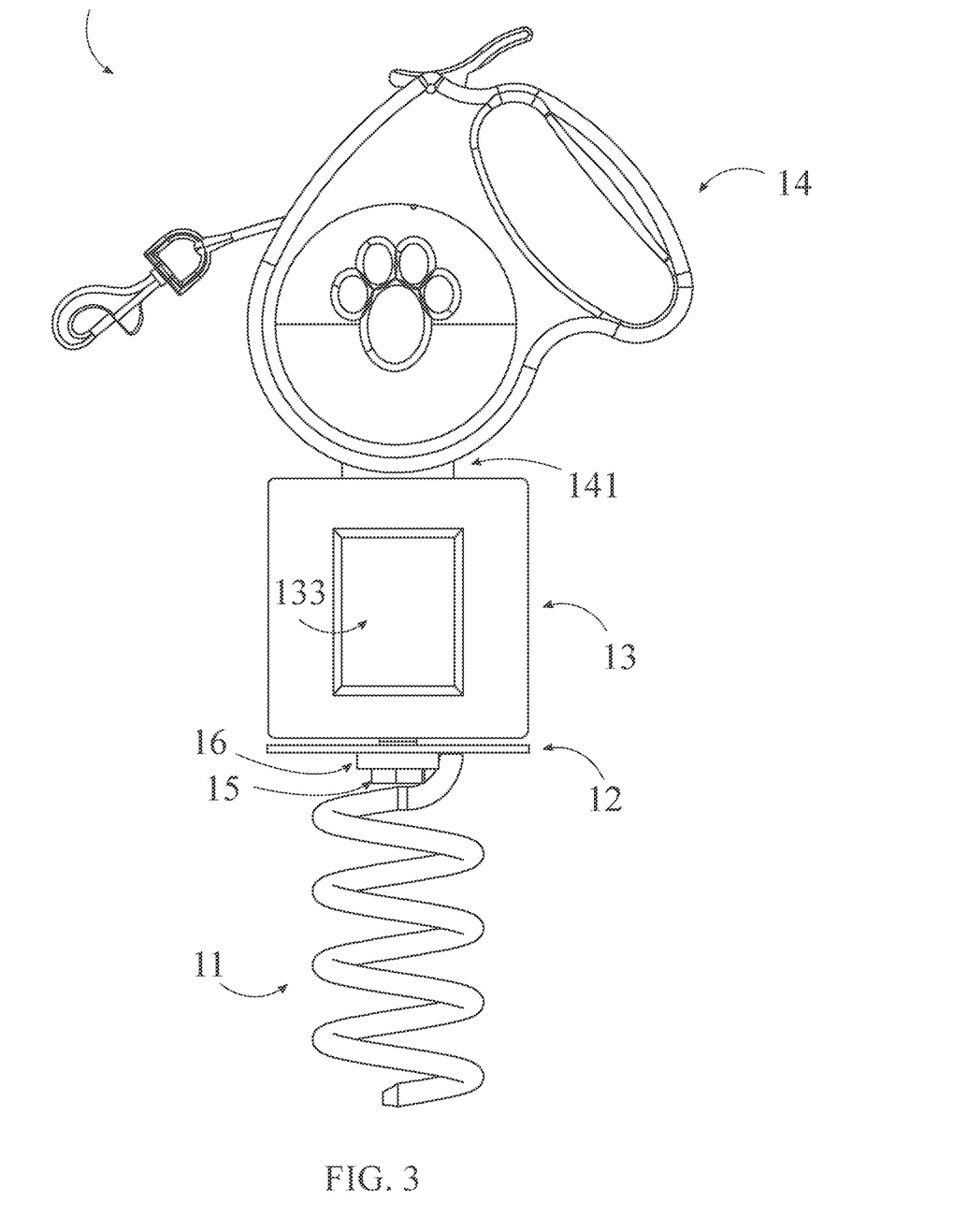
FIG. 3 is front view of the present invention.
Figure 4:
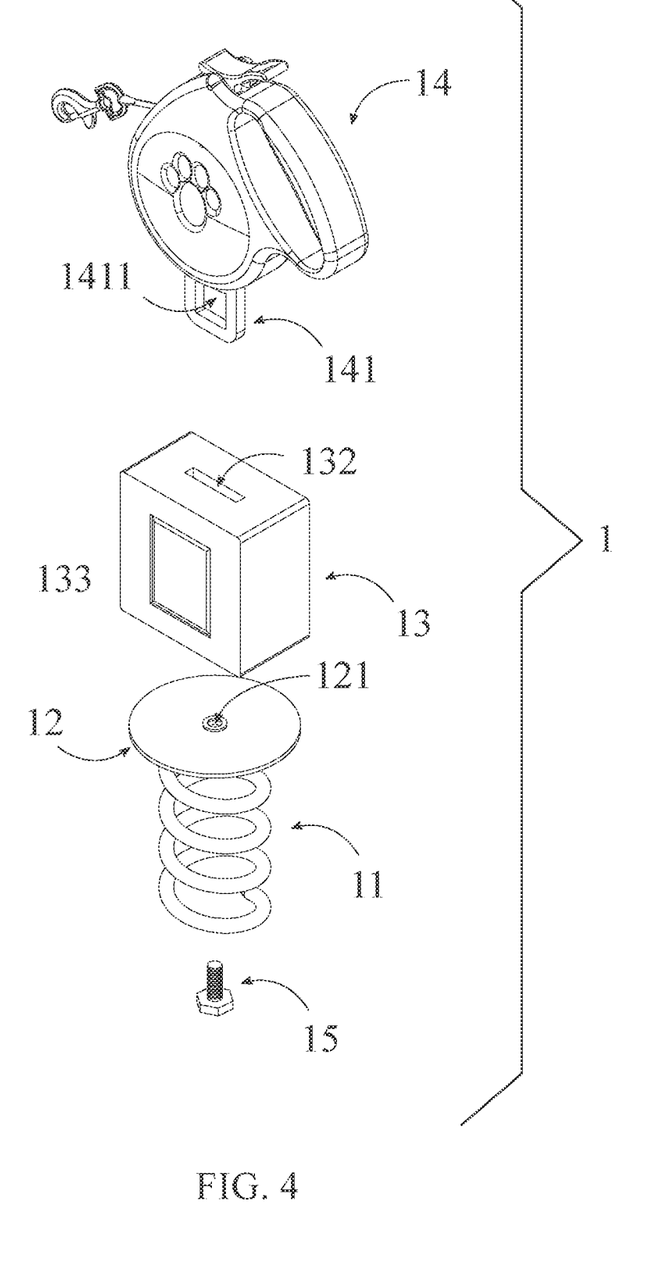
FIG. 4 is top exploded view of the present invention.

In the preferred embodiment of the present invention, the portable pet tether 1 further comprises an anchor axle 15, as shown in FIGS. 2-5 and 7. The mounting platform 12 comprises an anchor aperture 121, as shown in FIG. 4. The leash receiver 13 comprises a receiver aperture 135. The anchor aperture 121 traverses through the mounting platform 12. The receiver aperture 135 traverses into the leash receiver 13. The anchor axle 15 is rotatably connected to the anchor aperture 121, and the receiver aperture 135. In the preferred embodiment of the present invention, the anchor axle 15 may take the form of a bolt fastener that secures along the anchor aperture 121 and the receiver aperture 135, such that the leash receiver 13 rotates freely along the mounting platform 12.

In the preferred embodiment of the present invention the portable pet tether 1 further comprises a bushing 16, as shown in FIGS. 2-3, 5, and 7. The bushing 16 is concentrically aligned with the anchor aperture 121. The bushing 16 is connected adjacent to the anchor aperture 121. The anchor axle 15 is rotatably connected to the mounting platform 12 through the bushing 16. In the preferred embodiment of the present invention, the bushing 16 may take the form of a slider bearing. In another embodiment, the portable pet tether 1 further comprises the bushing 16. The bushing 16 is concentrically aligned with the receiver aperture 135. The bushing 16 is connected adjacent to the receiver aperture 135. The anchor axle 15 is rotatably connected to the leash receiver 13 through the bushing 16.

Figure 5:
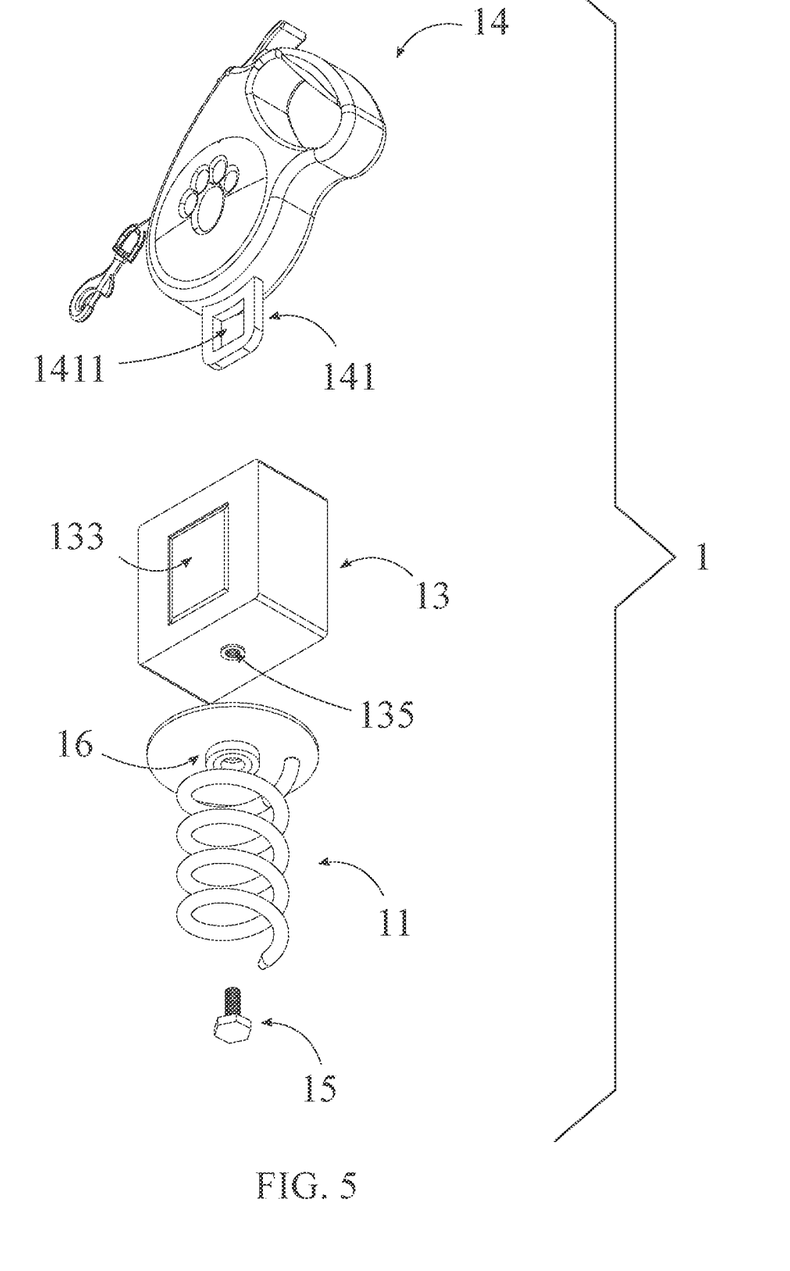
FIG. 5 is a bottom exploded view of the present invention.
Figure 6:
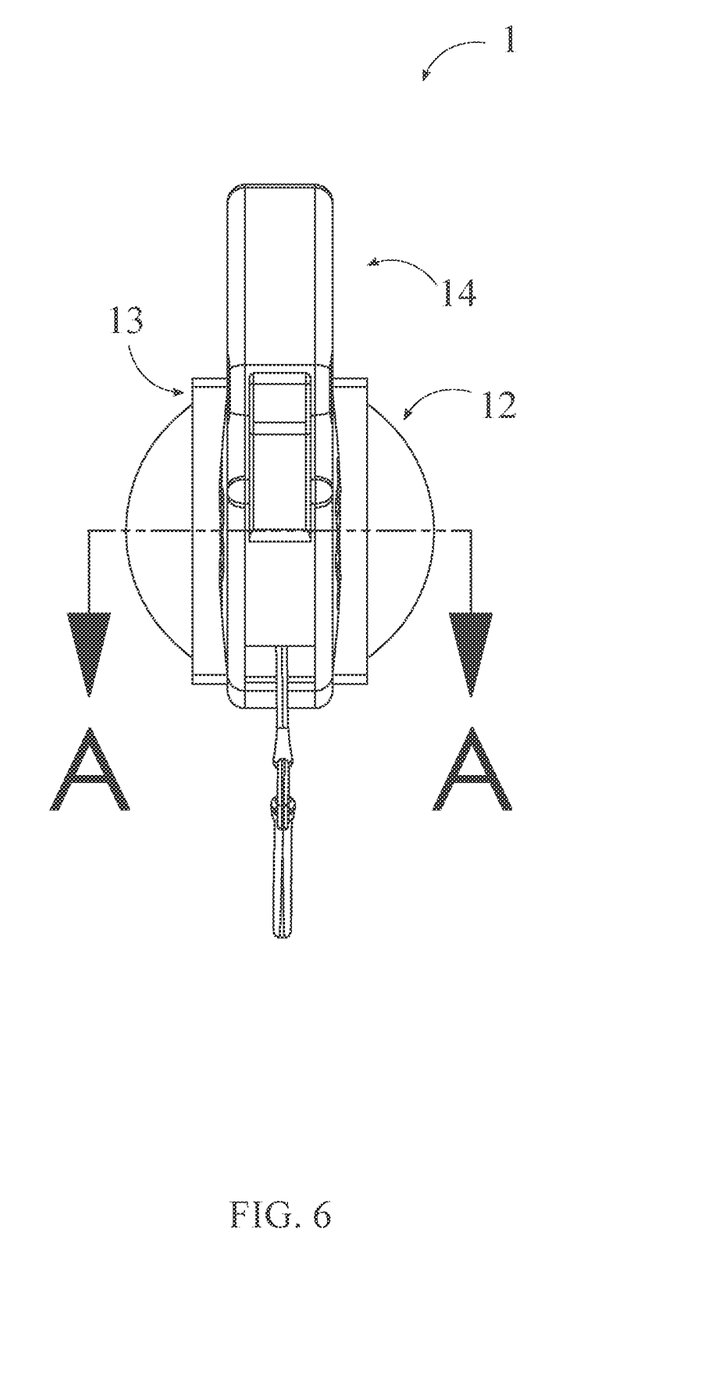
FIG. 6 is top view of the present invention.

In the preferred embodiment of the present invention, the leash receiver 13 comprises a rear wall 136, as shown in FIG. 7. The locking mechanism 134 comprises a locking arm 1341 and a spring 1342, as shown in FIG. 7. The mounting buckle 141 comprises a buckle aperture 1411, as shown in FIGS. 4-5 and 7. The rear wall 136 is positioned within the leash receiver 13, opposite to the release button 133. The locking arm 1341 is positioned within the leash receiver 13, between the rear wall 136 and the release button 133. The spring 1342 is positioned within the leash receiver 13, between the rear wall 136 and the locking arm 1341. The buckle aperture 1411 is removably attached to the locking arm 1341, where the mounting buckle 141 is positioned within the locking channel 132 when the mounting buckle 141 is attached to the locking mechanism 134. The release button 133 is operatively engaged with the locking mechanism 134, where the buckle aperture 1411 is detached from the locking arm 1341 through actuation of the release button 133. In the preferred embodiment of the present invention, the spring 1342 facilitates compression along the locking arm 1341, such that the locking arm 1341 is set to a default locked configuration. When the release button 133 is actuated, the locking arm 1341 is depressed towards the rear wall 136, such that it clears the buckle aperture 1411, allowing the mounting buckle 141 to detach from the leash receiver 13.

Figure 9:
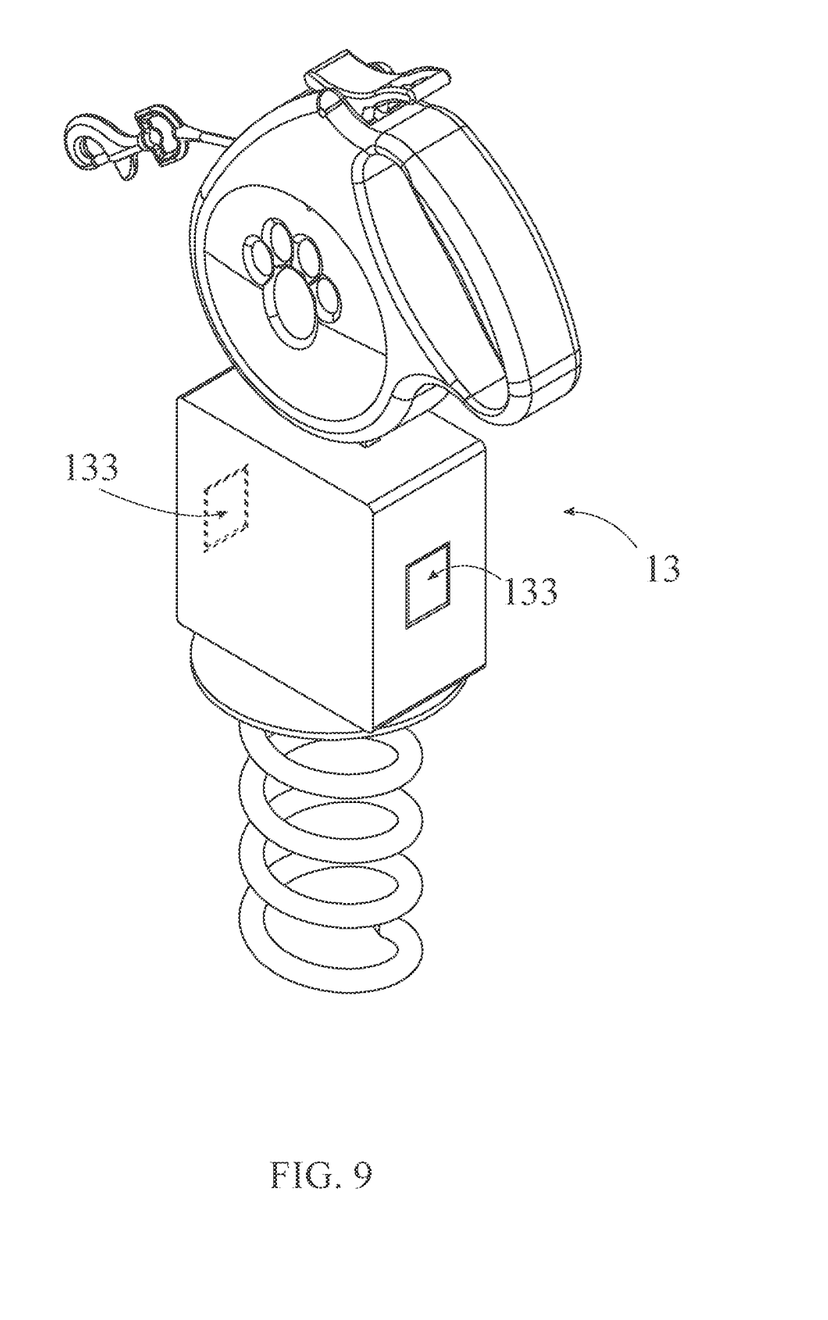
FIG. 9 is a perspective view of the present invention, in accordance to another embodiment.

In another embodiment, the leash receiver 13 comprises at least one release button 133, as shown in FIG. 9. The at least one release button 133 is operatively engaged with the locking mechanism, where the mounting buckle 141 is detached from the locking mechanism 134 through actuation of each of the release buttons 133. This prevents the unintentional actuation of the release button 133, as one or more release buttons 133 must be actuated to detach the mounting buckle 141 from the locking mechanism 134.

Figure 8:
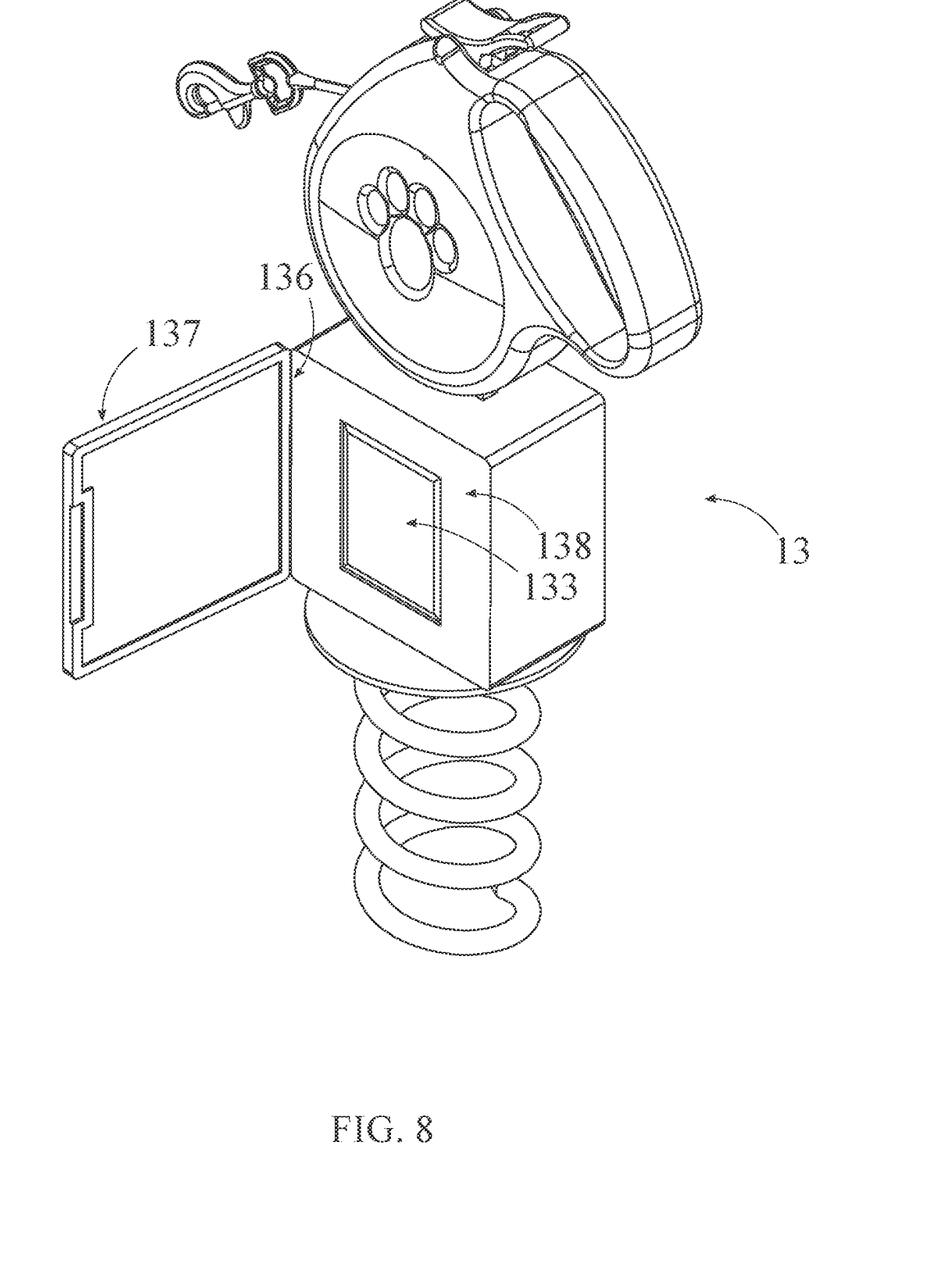
FIG. 8 is perspective view of the present invention that shows a button cover used in the present invention.

In the preferred embodiment of the present invention, the leash receiver 13 further comprises a button cover 137, as shown in FIG. 8. The button cover 137 is positioned adjacent to the release button 133. The button cover 137 is removably attached to the leash receiver 13, where the release button 133 is exposed when the button cover 137 is removed from the leash receiver 13. In the preferred embodiment of the present invention, the button cover 137 secures the release button 133 from being actuated unintentionally.

In the preferred embodiment of the present invention, the leash receiver 13 further comprises a release button side 138, and a mounting edge 136, as shown in FIG. 8. The release button side 138 is positioned adjacent to the release button 133. The mounting edge 136 is laterally positioned adjacent to the release button side 138 of the leash receiver 13. The button cover 137 is hingedly connected to the mounting edge 136, where the button cover 137 hinges between an opened position and a closed position along the release button side 138. The button cover 137 is removably attached to the leash receiver 13, where the release button 133 is exposed when the button cover 137 is hinged away from the leash receiver 13.

Although the invention has been explained in relation to its preferred embodiment, it is to be understood that many other possible modifications and variations can be made without departing from the spirit and scope of the invention as hereinafter claimed.

What is claimed is:
1. A portable pet tether comprising:
an anchor;
a mounting platform;
a leash receiver;
the mounting platform being connected adjacent to the anchor;
the leash receiver being rotatably connected to the mounting platform, opposite to the anchor portion side;

the leash receiver comprising an attachment mechanism, wherein the leash receiver is configured to removably receive a leash unit through the attachment mechanism;
an anchor axle;
the mounting platform comprising an anchor aperture;
the leash receiver comprising a receiver aperture;
the anchor aperture traversing through the mounting platform;
the receiver aperture traversing into the leash receiver;
the anchor axle being rotatably connected to the anchor aperture, and the receiver aperture;
a bushing;
the bushing being concentrically aligned with the anchor aperture;
the bushing being connected adjacent to the anchor aperture; and
the anchor axle being rotatably connected to the mounting platform through the bushing.

2. The portable pet tether, as claimed in claim 1, comprising:
a bushing;
the bushing being concentrically aligned with the receiver aperture;
the bushing being connected adjacent to the receiver aperture; and
the anchor axle being rotatably connected to the leash receiver through the bushing.

3. The portable pet tether, as claimed in claim 1, wherein the anchor is a corkscrew ground anchor.

4. The portable pet tether, as claimed in claim 1, comprising:
the leash receiver comprising a locking channel, a locking mechanism, and two release buttons;
a retractable leash body;
the retractable leash body comprising a mounting buckle;
the locking mechanism being positioned within the leash receiver;
the locking channel traversing into the leash receiver to the locking mechanism;
the mounting buckle being removably attached to the locking mechanism, wherein the mounting buckle is positioned within the locking channel when the mounting buckle is attached to the locking mechanism; and
the two release buttons being operatively engaged with the locking mechanism, wherein the mounting buckle is detached from the locking mechanism through actuation of each of the release buttons.

5. The portable pet tether, as claimed in claim 1, comprising:
the leash receiver comprising a locking channel, a locking mechanism, and a release button;
a retractable leash body;
the retractable leash body comprising a mounting buckle;
the locking mechanism being positioned within the leash receiver;
the locking channel traversing into the leash receiver to the locking mechanism;
the mounting buckle being removably attached to the locking mechanism, wherein the mounting buckle is positioned within the locking channel when the mounting buckle is attached to the locking mechanism; and
the release button being operatively engaged with the locking mechanism, wherein the mounting buckle is detached from the locking mechanism through actuation of the release button.

6. The portable pet tether, as claimed in claim 5, comprising:
a rear wall;
the locking mechanism comprising a locking arm and a spring;
the mounting buckle comprising a buckle aperture;
the rear wall being positioned within the leash receiver, opposite to the release button;
the locking arm being positioned within the leash receiver, between the rear wall and the release button;
the spring being positioned within the leash receiver, between the rear wall and the locking arm;
the buckle aperture being removably attached to the locking arm, wherein the mounting buckle is positioned within the locking channel when the mounting buckle is attached to the locking mechanism; and
the release button being operatively engaged with the locking mechanism, wherein the buckle aperture is detached from the locking arm through actuation of the release button.

7. The portable pet tether, as claimed in claim 5, comprising:
the leash receiver further comprising a button cover;
the button cover being positioned adjacent to the release button; and
the button cover being removably attached to the leash receiver, wherein the release button is exposed when the button cover is removed from the leash receiver.

8. The portable pet tether, as claimed in claim 5, comprising:
the leash receiver further comprising a button cover, a release button side, and a mounting edge;
the release button side being positioned adjacent to the release button;
the mounting edge being laterally positioned adjacent to the release button side of the leash receiver;
the button cover being hingedly connected to the mounting edge, wherein the button cover hinges between an opened position and a closed position; and
the button cover being removably attached to the leash receiver, wherein the release button is exposed when the button cover is hinged open from the leash receiver.

* * * * *